United States Patent [19]

Hentschel et al.

[11] 4,143,105
[45] Mar. 6, 1979

[54] ROD FOR SUPPORTING PLANTS AND PROCESS FOR ITS MANUFACTURE

[75] Inventors: Claus Hentschel, Cologne; Wulf von Bonin; Joachim Gehring, both of Leverkusen; Dietrich Hardt, Cologne, all of Fed. Rep. of Germany

[73] Assignee: Bayer Aktiengesellschaft, Leverkusen, Fed. Rep. of Germany

[21] Appl. No.: 782,473

[22] Filed: Mar. 28, 1977

[30] Foreign Application Priority Data

Apr. 17, 1976 [DE] Fed. Rep. of Germany ....... 2617020

[51] Int. Cl.$^2$ ............................................. B29D 27/00
[52] U.S. Cl. ......................................... 264/51; 264/53; 264/54; 47/44; 425/378 R; 428/18
[58] Field of Search ................................. 47/44–47; 428/17, 18, 19, 20; 264/45.8, 45.9, 50–55; 425/376 R, 378 R

[56] References Cited

U.S. PATENT DOCUMENTS

| | | | |
|---|---|---|---|
| 2,994,327 | 8/1961 | Otto et al. ................... | 264/45.9 X |
| 3,157,558 | 11/1964 | Adler, Jr. ...................... | 428/18 |
| 3,300,554 | 1/1967 | Bachus ........................ | 264/45.9 |
| 3,334,440 | 8/1967 | Choquette ..................... | 47/47 X |
| 3,466,705 | 9/1969 | Richie .......................... | 264/53 X |
| 3,720,572 | 3/1973 | Soda et al. .................... | 264/51 X |
| 3,773,877 | 11/1973 | Baker et al. ................... | 264/45.9 X |
| 3,801,686 | 4/1974 | Kyritsis et al. ................ | 264/51 |
| 3,803,277 | 4/1974 | Bassett ......................... | 264/54 X |
| 3,827,841 | 8/1974 | Kawai et al. .................. | 264/51 X |
| 3,863,000 | 1/1975 | Kasai et al. ................... | 264/45.9 X |
| 3,903,233 | 9/1975 | Dougherty .................... | 264/45.9 X |
| 3,957,936 | 5/1976 | Lauchenauer ................. | 264/53 |
| 4,022,858 | 5/1977 | Cavanna et al. ............... | 264/51 |
| 4,032,609 | 6/1977 | Smith ........................... | 264/53 |

FOREIGN PATENT DOCUMENTS

1261417  1/1972  United Kingdom ......................... 47/47

*Primary Examiner*—E. H. Eickholt
*Attorney, Agent, or Firm*—Sprung, Felfe, Horn, Lynch & Kramer

[57] ABSTRACT

The rot-resistant plant support which is aesthetically pleasing and can be inexpensively produced consists of a rod section and a plastics material which can be colored. The interior of the rod is finely porous while the surface zone has bark-like protuberances. The plant supports are manufactured by extrusion at processing temperatures in the tool adjusted to between 5 and 30° C. above the temperatures conventionally employed for extruding foams with a smooth surface from the same thermoplasts.

3 Claims, 4 Drawing Figures

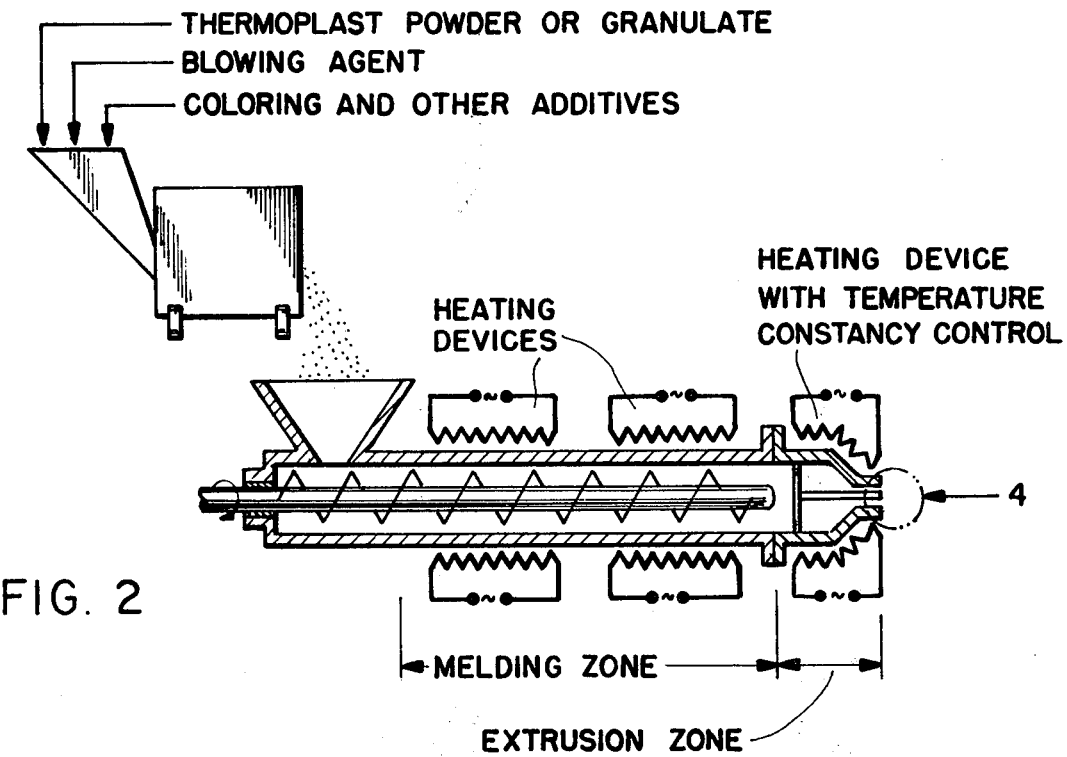
FIG. 2
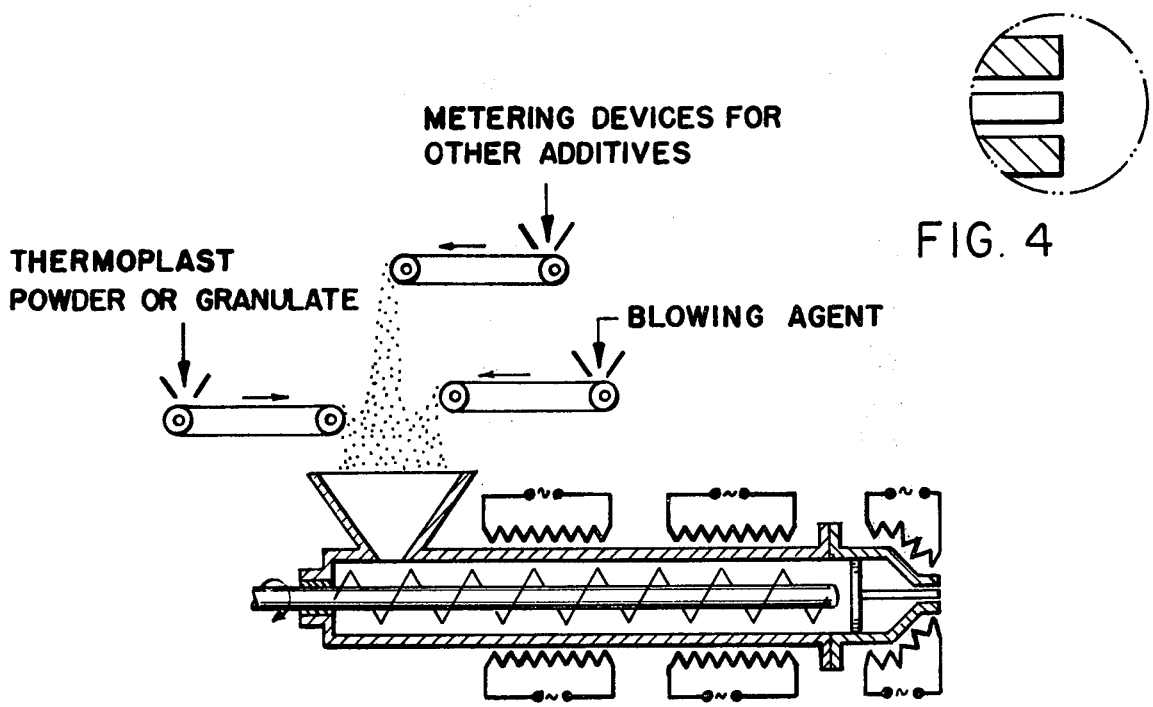
FIG. 3
FIG. 4

ROD FOR SUPPORTING PLANTS AND PROCESS FOR ITS MANUFACTURE

This invention relates to a rod for use as a plant support having a rough surface and to a process for the manufacture of such a rod.

In horticulture and particularly in the cultivation of decorative plants, there is a need for supports, for example for plants grown in pots. The supports used are generally sticks or ladders or the like made of wood or bamboo.

These conventional supports are inadequate because they are not rot-resistant. They are also aesthetically unsatisfactory because they do not have an organic appearance and therefore have the effect of foreign substances in the arrangement.

Attempts have been made to overcome the problems of rotting by using rods or tubes made of plastics. The aesthetic problem is then aggravated by the particularly unattractive appearance of the plastics surface.

To provide a firmer attachment between the plant and its support and to improve the optical effect, it is customary to glue moss or the like to the sticks to produce a better quality product. This again raises the problem of rotting. Alternatively, cork or foam granulates are glued to plastics rods. These supports are aesthetically not entirely satisfactory and moreover they are expensive to produce.

It is an object of the present invention to provide a plant support which has an aesthetically satisfying organic appearance, provides firm attachment to the plants and is rot-resistant and inexpensive to produce and a process for manufacturing the same.

According to the invention, there is provided a rod for supporting plants made of a porous plastics material having bark-like protuberances on its surface.

The rod section can be inexpensively produced, preferably by extrusion. No additional operation is required for obtaining the bark-like surface which provides a firm attachment for the plants. Resistance to rotting is ensured by the choice of suitable plastics material. There is no difficulty in colouring the material in any way desired before it is processed. The very irregular bark-like structure gives a natural, organic appearance to the rod section.

The desired bark-like surface can be obtained by extrusion under special conditions so that the surface of the extruded product (rod or tube) tears open on emerging from the die outlet or immediately thereafter and the cells on the surface burst.

The plant support preferably consists of a thermoplastic material which has a very rough surface and which has been foamed by means of a blowing agent, the roughness on the surface being obtained by bursting and tearing off the surface of the material during the process of extrusion.

One particularly interesting feature of the support devices obtainable according to the invention is that by virtue of their thermoplastic character they can easily be subjected to further shaping immediately after they have been produced, while they are still warm, or after a subsequent heating process, so that if desired they can be given an even more suitable appearance, for example they can be formed into branches.

According to the invention, there is also provided a process for the continuous manufacture of the rod by extrusion, wherein the temperature in the extruding apparatus is from 5° to 30° C. above the temperature conventionally used to produce an extruded foam having a smooth surface; and wherein a blowing agent in the amount of 1 to 5% by weight, based on the thermoplast, is added; the temperature in the die being kept substantially constant within ±3° C.; and the die having a sharp edged lip.

If desired, the lip of the die may in addition be serrated, notched or in some other way irregularly shaped.

The thermoplasts used are preferably rigid monophasic or multiphasic thermoplasts or thermoplast mixtures, for example substances obtained as salvage. Examples of such thermoplasts are indicated hereinafter. Their processing temperature employed for conventional extrusion of foams is indicated in brackets but depends to a large extent on the properties of the machine and the nature and quantity of additives used so that the actual temperatures employed may differ widely from those indicated, however the man skilled in the art is capable of a suitable adjustment of the temperature.

Suitable materials include, for example, homopolymers and copolymers based on polymerised vinyl monomers such as polystyrene (processing temperature $\sim 210°$ C.), acrylonitrile-butadiene-styrene (ABS) polymers ($\sim 190°$ C.), polyvinyl chloride (PVC) ($\sim 170°$ C.), polyethylene ($\sim 170°$ C.), polypropylene ($\sim 180°$ C.) but also polyaddition and polycondensation thermoplasts such as polyamides ($\sim 270°$ C.), polyurethanes ($\sim 170°$ C.), polyesters ($\sim 260°$ C.), polycarbonates ($\sim 270°$ C.). Apart from polystyrene and ABS copolymers which have the advantage of being readily accessible, PVC is preferred on account of its high rigidity. Some of the thermoplasts mentioned may be processed both as powders and as granulates.

The thermoplasts may also contain pulverulent or fibrous fillers such as quartz powder, kaolin, talcum, chalk, carbon fibres, glass fibres, gypsum fibres or potassium titanate.

The thermoplasts may, of course, also contain auxiliary agents for the extrusion process, e.g. stabilizers against heat, light and weathering, colouring pigments and optionally also perfumes and lubricants.

The usual blowing agents employed in the various thermoplastic foaming processes are suitable, for example gases such as $N_2$ and $CO_2$ introduced into the reaction mixture, readily volatile liquids such as halogenated hydrocarbons (e.g. refrigerants) or hydrocarbons (such as pentane or hexane). However, it has been found to be particularly suitable to use blowing agents which are added to the extruded material in powder form and are decomposed by heat to liberate a gas which acts as the blowing agent proper.

In principle, any blowing agents used for conventional foam extrusions are also suitable for this special process. Such blowing agents include pure azodicarbonamide or mixtures of azodicarbonamide with various additives such as activators and cell formers. Blowing agents based on sodium bicarbonate, disulphohydrazide or benzoxazine derivatives or mixtures thereof with azodicarbonamide may also be used.

In contrast to the conventional foam extrusion process in which it is aimed to produce smooth surfaces, in the process according to the invention special operating parameters are introduced to provide conditions for the controlled and reproducible formation of rough, bark-like surfaces.

While the reaction temperatures during foam extrusion should lie within the optimum range of the thermoplast used, the temperature of the extrusion tool is raised for obtaining the effect according to the invention. In addition, it is also important to ensure that the temperature in the tool is kept constant since deviations of greater than ±3° C. would have a deleterious effect on the quality of the extrusion product.

Furthermore, in contrast to conventional foam extrusion, the lip of the die used in this process should not be rounded off but must have a sharp edge. The amount of blowing agent used is also of major importance and should be between about 50 and 100% above the quantity used for conventional foam extrusion, and is determined according to the yield of gas from the blowing agent. Based on the quantity of thermoplast put into the process, the quantity of blowing agent varies between 1 and 5% by weight.

The temperature programme during extrusion depends, of course, on the thermoplast used. Slight temperature variations inevitably occur when using different machines and therefore also differently constructed screws and dies. The temperature must in all cases lie between 5° and 30° C. above the foam extrusion temperatures normally employed in the extrusion die for producing a product with a smooth surface.

The invention will be more clearly understood with reference to the drawings wherein:

FIG. 2 is a schematic of one embodiment of the process of the present invention;

FIG. 3 is a schematic of another embodiment of the process of the present invention; and FIG. 4 is a detail enlargement of FIG. 2 of the extruder die lip.

Figure 1:
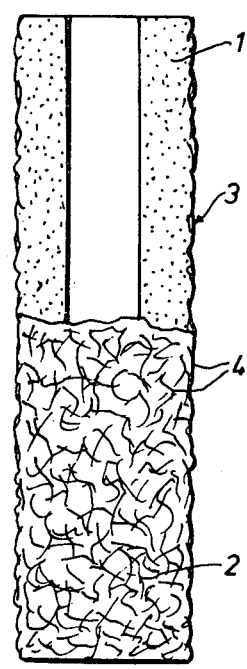
FIG. 1 is a partial cut away view of a rod according to the present invention.

Referring now to FIG. 1, the interior 1 of the hollow rod section 2 consists of finely porous polyethylene. The surface zone 3 has a plurality of bark-like protuberances 4.

FIGS. 2-4 refer to the process of the present invention.

Introduction of the blowing agent may be carried out by two main methods, application of blowing agent to the plastics granulate by means of a slowly rotating mixer or by incorporation of the blowing agent into the plastics powder by mixing.

Mixing may be carried out in a mixer preceding the extrusion apparatus as shown in FIG. 2 or it may be carried out by direct addition into the feed hopper of the extruder by means of automatic dosing apparatus as shown in FIG. 3.

The mixture is then conveyed to the welding zone and thereafter to an extrusion zone having a sharp-edged die lip as shown in greater detail in FIG. 4. The die is kept at a constant temperature by suitable conventional means.

The plant supports according to the invention are suitably produced in moulds adapted to the extrusion process, for example in the form of sections or rods which may vary in cross-section and may also be in the form of hollow profiles or tubes. The latter should if possible be provided with slot-and-feather type connections. The supports may have any diameter, e.g. between 0.5 and 10 cm or more. They can generally be cut and sharpened with any implements, e.g. knives, and can thus be easily inserted in the soil in which the plant is growing.

It has been found that PVC and copolymers of styrene are particularly suitable for obtaining a very rough surface.

The invention will now be explained with the aid of examples.

EXAMPLE 1

A suspension PVC having a K-value of ~60 was used as starting material.

A pulverulent ABS copolymer was added to improve the flow conditions in the screw. The formulation contained the following constituents:

85 Parts by weight of suspension PVC, K-value ~60
15 parts by weight of ABS copolymer powder
6 parts by weight of calcium carbonate (as filler and cell regulator)
2.6 parts by weight of tribasic lead sulphate (stabilizer)
1.5 parts by weight of lead stearate (stabilizer)
0.75 parts by weight of montanic acid ester (lubricant)
0.75 parts by weight of polyethylene wax (lubricant)
1 part by weight of pigment.

Method A

The constituents of the above formulation were processed to a dry blend in a high speed mixer (heating and cooling mixer combination, Model TSEH/KMSO manufactured by Papenmeier) at mixing temperatures of up to 120° C., and the dry blend was finally granulated on a Bitruder, model BT 30 of Schloemann, at about 140° C.

2% of a modified benzoxazine derivative was used as blowing agent, which was applied to the granulate by means of a mixing drum operating for 5 minutes.

Extrusion was carried out in a single screw extruder, model S3ORG of Reifenhäuser, using the following mixing and extrusion conditions:

| | |
|---|---|
| Screw diameter: | 30.0 mm |
| Screw length: | 150 cm |
| Screw compression: | 1 : 2.5 |
| Diameter of tubular extrusion die: | 13.8 mm |
| Diameter of mandrel of tubular die: | 7.0 mm |
| Temperatures (from intake to extrusion die): | 160° C, 210° C, 170° C, 155° C, 155° C. |

18 Revs/min at a current of 2.5 A.

It is most important to ensure exact temperature control in the extrusion die since the desired roughness of the surface can no longer be obtained if there are even slight temperature deviations in either direction.

Method B

The same mixture was used as indicated above but in this case the blowing agent was added to the pulverulent mixture after preparation of the dry blend and the section was then directly extruded from the powder in an extruder suitable for processing powder.

Here again temperature control in the die is important.

Extrusion was carried out in a single screw extruder, model HPE 45-24 manufactured by Henschel, using the following mixing and extrusion conditions:

| | |
|---|---|
| Screw diameter: | 45 mm |
| Screw length: | 240 cm |
| Screw compression: | 1 : 3 |

-continued

| Die | Solid circular rod (diameter 12 mm) |
|---|---|
| Temperatures (from intake to die): | 160° C, 210° C, 165° C, 158° C. |

15 revs/min at a current of 6 A.

Comments on methods A and B

After extrusion from the die, the foamed tube or rod with bark-like surface is not calibrated as in conventional foam extrusion but simply passed through a cooling vat by means of a discharge device since calibration would partly smooth down the surface of the material which is still in the plastic state. After passing through the cooling zone and discharge device, the extruded rod is cut up into the desired lengths.

EXAMPLE 2

A granular ABS copolymer was used as starting material in this case. 2% of a modified benzoxazine derivative was again used as blowing agent and applied to the granulate by drum.

Extrusion was carried out in the same Reifenhauser single screw extruder as in Method A of Example 1.

The only difference was the temperature programme, which was adjusted to this particular thermoplast:

| Temperatures (from intake to extrusion die): | 165° C, 215° C, 170° C, 165° C, 165° C. |
|---|---|

30 revs/min at a current of 2.5 A.

The subsequent devices were similar to those used in Methods A and B in Example 1.

What we claim is:

1. A process for the manufacture of a rod comprising foaming a thermoplast by a blowing agent and producing bark-like protuberances by tearing and bursting during extrusion wherein the temperature in the extruding apparatus is from 5° to 30° C. above the temperature conventionally used to produce an extruded foam having a smooth surface; and wherein a blowing agent in the amount of 1 to 5% by weight, based on the thermoplast, is added; the temperature in the die being kept substantially constant within ±3° C.; and the die having a sharp edged lip.

2. A process as claimed in claim 1, wherein the lip of the die is irregularly shaped.

3. A process according to claim 1, comprising mixing the thermoplast to a dry blend at temperatures of up to 120° C., granulating same at about 140° C., applying the blowing agent and extruding by a single screw extruder.

* * * * *